(12) United States Patent
Igarashi et al.

(10) Patent No.: US 7,004,022 B2
(45) Date of Patent: Feb. 28, 2006

(54) EQUIPMENT FOR MEASURING GAS FLOW RATE

(75) Inventors: Sinya Igarashi, Ibaraki-ken (JP);
Hiroshi Kikawa, Ibaraki-ken (JP);
Yasuhiro Asano, Ibaraki-ken (JP);
Naoki Saito, Ibaraki-ken (JP)

(73) Assignees: Hitachi, Ltd., Tokyo (JP); Hitachi Car Engineering Co., Ltd., Hitachinaka (JP)

( * ) Notice: Subject to any disclaimer, the term of this patent is extended or adjusted under 35 U.S.C. 154(b) by 0 days.

(21) Appl. No.: 10/484,075

(22) PCT Filed: Dec. 17, 2001

(86) PCT No.: PCT/JP01/11032

§ 371 (c)(1),
(2), (4) Date: Jan. 16, 2004

(87) PCT Pub. No.: WO03/008913

PCT Pub. Date: Jan. 30, 2003

(65) Prior Publication Data

US 2004/0182171 A1    Sep. 23, 2004

(30) Foreign Application Priority Data

Jul. 18, 2001    (JP) .............................. 2001-217520

(51) Int. Cl.
*G01F 1/68*    (2006.01)

(52) U.S. Cl. ..................................... 73/204.22; 73/861

(58) Field of Classification Search .................. 73/861, 73/202.5, 204.11, 204.21, 204.22, 204.26
See application file for complete search history.

(56) References Cited

U.S. PATENT DOCUMENTS 5,696,321 A * 12/1997 Igarashi et al. ............ 73/202.5

(Continued)

FOREIGN PATENT DOCUMENTS

JP            7-139414            5/1995

(Continued)

OTHER PUBLICATIONS

International Search Report.

*Primary Examiner*—Edward Lefkowitz
*Assistant Examiner*—Corey D. Mack
(74) *Attorney, Agent, or Firm*—Crowell & Moring LLP

(57) ABSTRACT

The flow detecting elements are provided at the sub-passage for making the part of fluid to be measured (gas) flow. The wall of the sub-passage contains a leak hole (through hole) to drain a liquid having entered and accumulated inside the sub-passage. A protrusion for generating a dynamic pressure on the opening is arranged close to the opening of the leak hole on the external surface of the sub-passage. Alternatively, a protrusion located upstream from the leak hole is formed on the inner wall surface of the sub-passage. The former protrusion generates a dynamic pressure in response to the flow velocity of the gas flowing along the external surface of the sub-passage. The latter protrusion produces a separation flow area for separating the flow from the internal surface of the sub-passage (close to the leak hole), whereby the pressure of the separation floe area is reduced. This configuration provides almost the same pressure differences on the openings of the internal and external surfaces of the sub-passage, thereby reducing the amount of gas leaked from the leak hole. This reduces changes in the distribution flow velocity in the sub-passage between the cases where the leak hole is blocked and where not blocked, and minimizes flow measurement errors.

Further, to prevent a liquid film or drop from being formed on the opening by surface tension, structural means is provided close to the opening of the leak hole on the external surface of the sub-passage.

22 Claims, 16 Drawing Sheets

| U.S. PATENT DOCUMENTS | | | | FOREIGN PATENT DOCUMENTS | | |
|---|---|---|---|---|---|---|
| 6,220,090 B1 * | 4/2001 | Kohno et al. ............... 73/202 | | JP | 8-094409 | 4/1996 |
| | | | | JP | 8-193863 | 7/1996 |
| 6,223,594 B1 * | 5/2001 | Takiguchi et al. ....... 73/204.21 | | JP | 9-273950 | 10/1997 |
| 6,708,561 B1 * | 3/2004 | Zurek et al. ............. 73/204.22 | | * cited by examiner | | | a # EQUIPMENT FOR MEASURING GAS FLOW RATE

FIELD OF THE INVENTION

The present invention relates to a gas flow measurement apparatus for measuring a gas flow rate.

It particularly relates to a gas flow measurement apparatus having flow detecting elements in a sub-passage through which part of the gas to be measured passes.

For example, it relates to a thermal resistor type air flow measurement apparatus for measuring the intake air flow rate in an automobile engine.

BACKGROUND OF THE INVENTION

As a thermal resistor type air flow measurement apparatus (gas flow measurement apparatus) for measuring the intake air flow rate taken into the automobile engine, it is well-known that the apparatus is equipped with a main passage in which the fluid to be measured flows and a sub-passage in which part of the fluid flows. The flow detecting elements such as a heating resistor and a thermal sensitive resistor are set in the sub-passage.

Such a sub-passage type flow rate measurement apparatus can stabilize the flow of the gas by utilizing the sub-passage structure. The flow detecting elements can reduce that the flow detecting elements are affected by the changes of the flow velocity distribution, by the pulsation flow and the back flow. Further, it can reduce the contamination of the flow detecting elements, and thereby can reduce the deterioration of quality of the elements. Further, in this apparatus, the flow detecting elements can be mounted easily on the main passage and protected effectively.

When, however, the internal configuration of the sub-passage changed due to adherence of foreign substances, the measuring values of the apparatus will be increased over those of the gas flow measuring apparatus without sub-passage. To improve the function of the sub-passage, various modifications and improvements are incorporated in the shape of the passage, and this tends to complicate the shape of the sub-passage. Especially in order to reduce the pulsating flow and to maintain the measuring accuracy, the sub-passage is designed to have a bent form, with the result that foreign substances tend to deposit in the bent portion. The most probable trouble is that, depending on the mounting angle of the flow measuring apparatus, such a liquid as water will accumulate in the sub-passage, or water remains in the bent portion of the curved sub-passage, thereby causing a flow measurement error.

To solve such problems, technical means are proposed to provide a drain hole for preventing water from remaining in the sub-passage, as disclosed in the Japanese Application Patent Laid-Open Publication No. Hei 07-139414 and Japanese Application Patent Laid-Open Publication No. Hei 09-273950.

The flow measuring apparatus provided with such a drain hole is intended to prevent from troubles caused by remaining of water in the sub-passage or submersion of the flow detecting elements in water.

The so-called leak hole (leak path) including the above-mentioned drain hole is a small hole that does not sacrifice the function of the sub-passage, and prevents from making water remain in the sub-passage. However, the last remaining liquid drop may remain inside the leak hole due to the surface tension.

Such a residual liquid drop such as waterdrop blocks the leak hole, and this causes greater changes in air flow velocity distribution than those when the leak hole is not blocked.

Such a phenomenon causes deterioration of accuracy and performances including changes in the measurement value and increase of output noise.

The present invention has been made to solve these problems. It prevents water and other liquids from adhering and remaining in the sub-passage, and provides a sub-passage that minimizes the flow measuring error caused by liquid drops blocking the leak hole.

DISCLOSURE OF INVENTION

When water and other liquids have remained in the sub-passage, a flow measurement error will be smaller if such liquids are of smaller size. However, if liquid drops have collected to form big particles or they have accumulated in a particular portion, changes in the flow division ratio will be caused by the changes in flow velocity distribution of the gas flowing in the sub-passage and changes in the resistance of the sub-passage to the flowing gas. This will result in a flow measurement error.

Such remaining of liquid in the sub-passage can be avoided by providing a leak hole for leading the liquid out of the sub-passage so that the liquid can be drained out of the sub-passage, as described above. However, this leak hole must be designed to drain easily the liquid; for example, it must have a specified sectional area.

On the other hand, to make full use of its functions, the sub-passage must be designed so that gas flows inside as intended by the passage. The leak hole is the passage that does not meet the object of the sub-passage. It must have a structure that makes it hard for liquid to flow. This can be achieved, for example, by reducing the sectional area of the leak hole.

To solve these problems, the present invention proposes the following solutions:

(1) The first of the present inventions provides a structural means, wherein a leak hole is provided to drain the liquid remained in the sub-passage, and the gas to be measured flowing in the sub-passage hardly flows through the leak hole.

In the first invention, a leak hole (through hole) between the internal surface and the external surface of said sub-passage is provided en route from the inlet of the said sub-passage to the outlet thereof; the openings of said through hole is located on the internal surface and the external surface of said sub-passage, and a structural means for reducing the amount of the leak gas passing through said through hole is provided close to at least one of said openings.

This configuration prevents water or other liquids from remaining in the sub-passage due to the leak hole. Further, even if the last liquid drop remaining subsequent to almost complete removing of liquid remains in the leak hole due to surface tension, and thereby the leak hole is blocked, the measurement errors are prevented as follows. The distribution of air velocity in the sub-passage maintains an approximately the same pattern in any case, since the status prior to blocking of the leak hole is so designed as to reduce the amount of flow through the leak hole. This configuration minimizes the difference of flow measurement errors between the cases where the leak hole is blocked and where not blocked.

(2) The above-mentioned leak hole is formed in such a size and shape that the liquid does not remain in excess of the level where the affect on the flow measurement accuracy cannot be ignored.

As an embodiment for reducing the amount of gas passing through the above-mentioned leak hole in the sub-passage, the present invention proposes a structural means that generates the dynamic pressure close to the opening of the leak hole on the external surface of the sub-passage. The dynamic pressure generates according to the velocity of the gas to be measured, thereby increasing the pressure of that portion. Alternatively, it is also possible to assume that the portion close to the opening of the leak hole on the internal surface of the sub-passage is formed as a separation flow area for separating the gas flow from the internal surface of the sub-passage. Thereby, the pressure of that area is reduced, and the difference of the pressures inside and outside the leak hole is also reduced, the amount of the gas flowing through the leak hole is much reduced.

(3) To put it more specifically, the size of the leak hole is less than one fifth of the sub-passage outlet area, such that the liquid is kept to remain there by the surface tension when there is a small amount of the remained liquid. For example, when the liquid consists of water, the diameter of the leak hole or the width of the shorter side of thereof is 1 through 5 mm.

Further, a protrusion for generating the dynamic pressure is provided close to the opening of the leak hole on the external surface of the sub-passage. This protrusion is intended to generate a dynamic pressure close to the opening of the leak hole on the external surface of the sub-passage, according to the velocity of the gas flow through the main passage. When the shape and size of the protrusion is properly set, the dynamic pressure is adjusted so that the pressure differences generated at the openings of the leak hole between the internal surface and the external surface of the sub-passage will be almost the same.

(4) To reduce the amount of the gas passing through the leak hole, a protrusion is arranged upstream from the leak hole, on the internal surface of the sub-passage. This protrusion is used in such a way that the portion close to the opening of the leak hole on the internal surface of the sub-passage is formed as a separation flow area for separating the gas flow from the internal surface of the sub-passage. Thereby, the pressure of that area is reduced to the level almost equal to the pressure close to the leak hole on the external surface of the sub-passage.

The liquid causing measurement errors is drained out of the sub-passage by the leak hole, on the one hand. For the gas, on the other hand, the pressures on both sides of the leak hole are almost the same, so that there is almost no flow of gas through the leak hole. That is, there is practically no leak hole for gaseous fluids. This prevents the function of the sub-passage from being deteriorated. Further, when the leak hole is blocked by water remaining there due to surface tension or the like, the gas flow is almost the same as that when the hole is not blocked. This configuration maintains required flow measurement accuracy.

(5) According to the second invention, a liquid film removing structure is provided to ensure that water and other liquids do not remain in the form of a liquid drop or liquid film due to surface tension or the like in the leak hole. This arrangement avoids a flow measurement error that may be occurred when the leak hole is blocked.

For example, the leak hole is designed to have such a size and shape that do not affect the function of the sub-passage.

Further, the portion close to the opening of the leak hole on the external surface of the sub-passage is provided with the structural means (e.g., a protrusion, plate-formed member and rod-formed member). When this arrangement has been made, the surface of the liquid drop or film formed in the leak hole hangs down, and when it comes in contact with a plate- or rod-formed object, the liquid drop is pulled out by the object, with the contact angle of the liquid drop on the surface of the object. Thereby the liquid the liquid drop is prevented from remaining in the leak hole.

Another embodiment proposes an arrangement wherein the dynamic pressure of gas flowing through the sub-passage is applied to the opening of the leak hole on the internal surface of the sub-passage. Thus, the liquid drop or the liquid film tending to remain in the leak hole is broken by the dynamic pressure of gas.

For example, a partition wall is formed upstream from the leak hole in the sub-passage to create a flow of gas moving toward the opening surface of the leak hole on the internal surface of the sub-passage. The dynamic pressure caused by flow of gas is formed on the opening surface of the leak hole on the internal surface of the sub-passage. Further, the end upstream from the partition wall is arranged to be the portion where higher pressure in the sub-passage is applied, thereby increasing the pressure on the opening surface of the leak hole on the internal surface wall surface of the sub-passage.

BEST FORM OF EMBODIMENT OF THE PRESENT INVENTION

The first embodiment of the present invention will be described hereinafter with reference to FIGS. 1 through 3 and 6. Further, FIGS. 4 and 5 will be used to describe the state of water remaining in the sub-passage in the prior art example and the present embodiment. Further, the function of this embodiment will be described based on the result of flow analysis according to FIGS. 7 through 10.

Figure 1:
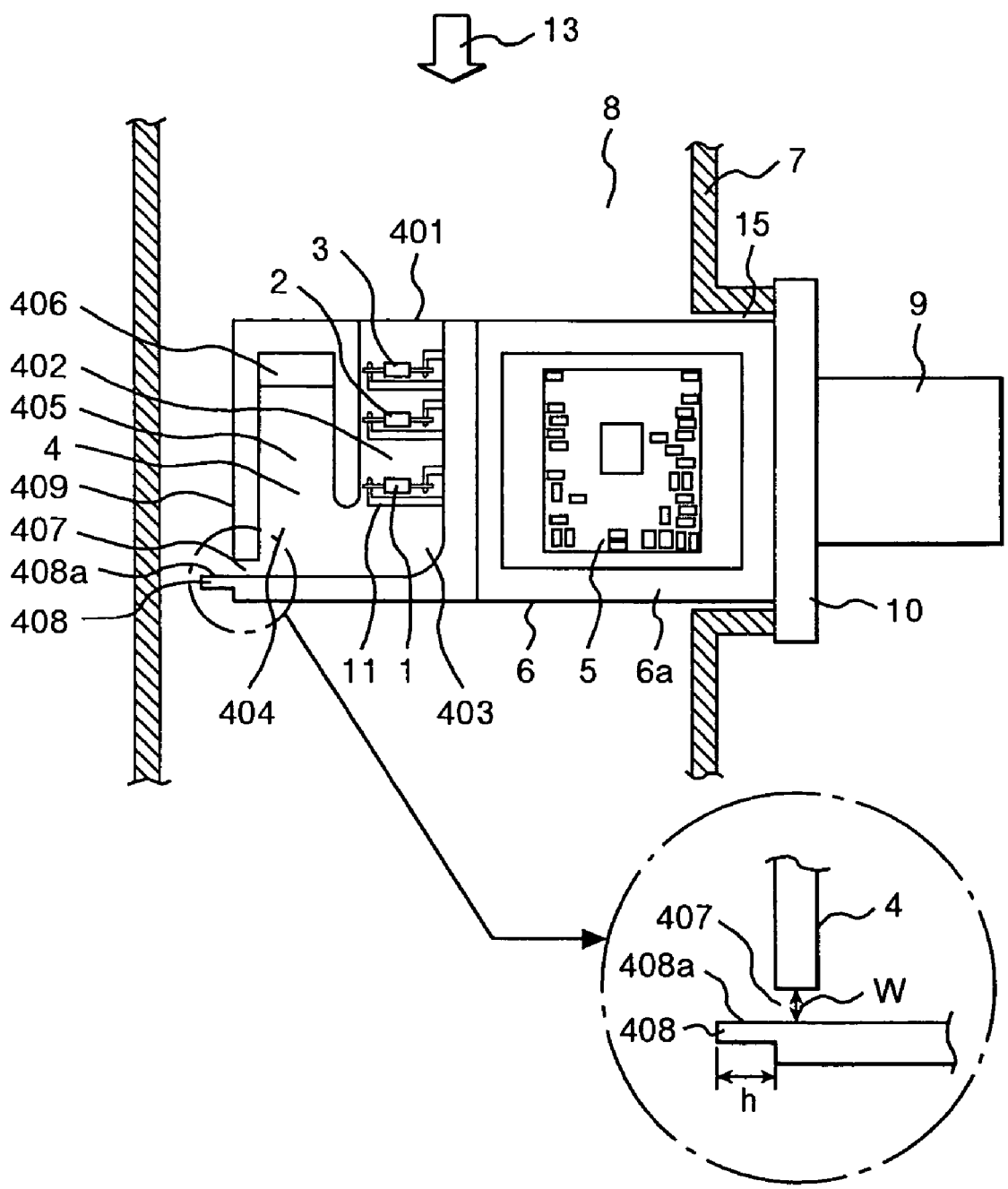
FIG. 1 is a cross sectional view and its partially enlarged view representing a gas flow measuring apparatus as a first embodiment of the present invention where the gas flow measuring apparatus is shown with the cover removed.

FIG. 1 is a cross sectional side view and its partially enlarged view representing a thermal resistor type air flow measurement apparatus for measuring the air flow rate taken into an automobile engine, wherein the gas flow measurement apparatus is shown with the cover removed.

The air flow measurement apparatus (gas flow measurement apparatus) comprises of a main passage 8 through which an intake air as a gas to be measured flows, and a sub-passage 4 through which part of the intake air flows. The sub-passage 4 is provided in the main passage 8.

In this embodiment, a heating resistor 1, a thermo-sensitive resistor 2 and an intake air temperature measuring element 3 are fixed to each terminal 11 so that they are located inside the sub-passage 4, and are electrically connected with an electronic circuit 5.

The electronic circuit 5 controls the heating temperature of the heating resistor 1, based on the intake air temperature detected by the thermo-sensitive resistor 2. For example, the current (heating current) flowing to the heating resistor 1 is controlled so that the temperature difference between the heating resistor 1 and thermo-sensitive resistor 2 will reach a predetermined temperature difference level. The amount of heat radiated from the heating resistor 1 is approximately proportionate to the air flow rate, so the electric signal corresponding to the air flow rate can be sent via a connector 9 to the external equipment by detecting the heating current. In the present embodiment, this method is used to measure the air flow rate. It is also possible to locate thermo-sensitive resistors on upstream and downstream from the heating resistor, and to measure the air flow rate based on the temperature difference between the two resistors. There is no restriction on the method of measurement.

The signal of intake temperature measuring element 3 can be used for temperature correction of the thermo-sensitive resistor 2 or for other purposes.

A housing 6 is a plastic component molded with inserting such metallic components as the terminal 11. It is an united formation of a case member 6a forming a frame for incorporation and protection of the electronic circuit 5, a connector 9 for electric connection with an external device, and a flange member 10 for fixing onto a member 7 constituting the main passage 8.

The sub-passage 4 is a plastic molded product, and is connected to the housing 6 or is formed integrally with the housing 6. Thus, the housing 6 and sub-passage 4 are integrally structured in parallel arrangement.

Figure 2:
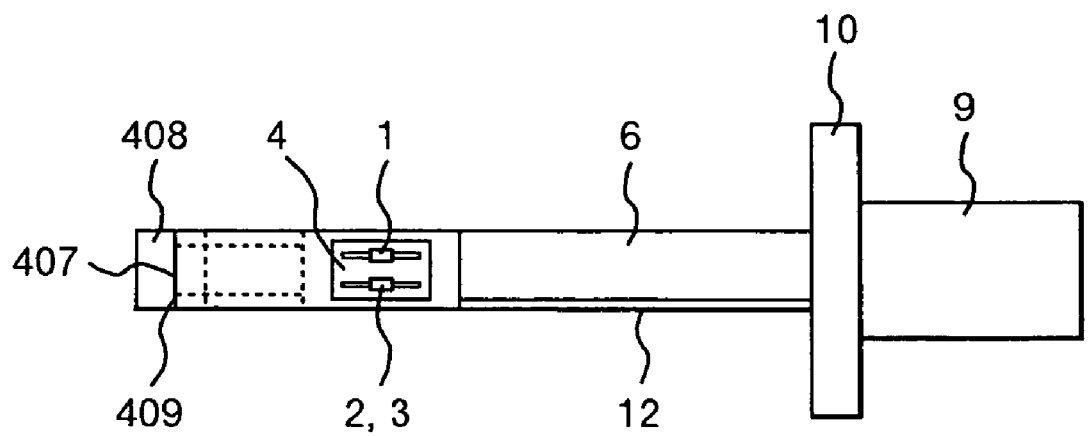
FIG. 2 is an external view of this embodiment in FIG. 1 as viewed from the top (from the upstream side)
Figure 3:
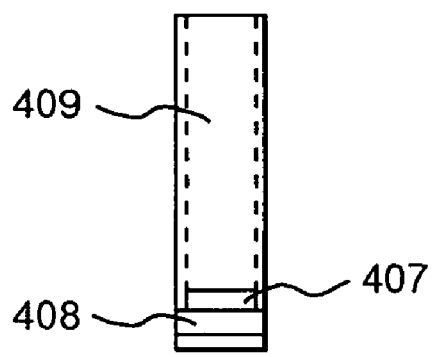
FIG. 3 is an external view of this embodiment in FIG. 1 as viewed from the left (bottom view)

The electronic circuit 5 is installed inside the case member 6a of the housing 6 and is protected by attaching a cover 12 to the housing 6 so as to cover the case member 6a, as shown in FIG. 2.

Accordingly, the electric circuit, the detecting elements, the sub-passage and the connector are formed in an integral module.

The sub-passage 4 is serially formed by;

an air flow inlet 401 opening on the plane approximately perpendicular to the main flow direction 13 of air passing through the main passage;

a first flow path 402 parallel to the main flow direction 13;

a first bent portion 403 bending approximately perpendicular to the main flow direction 13;

a second bent portion 404 further bending approximately perpendicularly;

a second flow path 405 which is arranged in parallel with the first flow path 402, and lets the air flow turned over through these bent portions pass;

an air flow outlet 406 opening on the plane approximately parallel to the main flow direction 13 at the downstream of the path 405 (it's located in an upper side in the main flow direction 13). Thus the sub-passage 4 forms a U-shaped circuitous passage.

The heating resistor 1, the thermo-sensitive resistor 2 and the intake temperature measuring element 3 are provided in the first flow path 402.

Further, in the sub-passage 4, a leak hole (through hole) 407 and a plate-formed projection (hereinafter referred to as "dynamic pressure plate") 408, which are major points of the present invention, are provided at the bent portion 404. They are formed integrally with the wall of the sub-passage 4.

The leak hole 407 opens on the internal surface and the external surface of the sub-passage 4, thereby the sub-passage 4 communicates with the main passage. The cross section of the leak hole 407 can be designed in circular, rectangular and many other forms. In the present embodiment, an oblong slit is used as a leak hole, and its size is determined on the order of millimeters. For example, the shorter side is about 2 mm long. The longer side is set to the width of the sub-passage (See FIG. 3). The size of this leak hole is determined as desired, with reference to sizes of the sub-passage, the main passage and the dynamic pressure plate 408.

The dynamic pressure plate 408 is located on the plane (base of the external surface of the sub-passage) 409 parallel to the main flow direction on the external surface of the sub-passage 4. It is arranged close to the opening of the leak hole 407 on the external surface of the sub-passage. When the upstream and downstream sides in the direction of the main flow 13 is defined, with reference to the position of the opening of the leak hole 407 on the external surface of the sub-passage, the dynamic pressure plate 408 is formed so as to protrude from the base 409 of the external surface of the sub-passage at the position of the downstream side.

This dynamic pressure plate 408 serves as an obstacle to the main flow 13. When the main flow 13 is received by this obstacle, the dynamic pressure occurs at the opening of the leak hole 407 on the external surface of the sub-passage (leak hole outlet).

In the present embodiment, the dynamic pressure plate 408 is formed so that the surface 408a facing to the upstream side of the main passage is perpendicular to the main flow. The height "h" of the dynamic pressure plate 408 (distance from the opening of the leak hole 407 on the external surface of the sub-passage to the protruded end of the dynamic pressure plate 408) is set, for example, to about 0.5 through 2 times the length W of the short side of the leak hole 407 (diameter if the leak hole is circular). Here the optimum value is 2.5 through 3.0 mm.

The dynamic pressure plate 408 is used as a structural means to ensure that the leakage of air passing through the leak hole 407 is decreased by minimizing the difference between the pressure close to the second bent portion 404 in the sub-passage 4 (on the opening of the leak hole 407 on the internal surface of the sub-passage) and the pressure on the opening of the leak hole 407 on the external surface of the sub-passage.

The main passage 8 is used as the flow path through which the air to be measured passes. In the case of a car engine, for example, it corresponds to the intake pipe located from an air cleaner to the upstream of the engine cylinder. In the thermal resistor type air flow measurement apparatus for automobile, the member 7 constituting this main passage 8 is located on the midpoint of the intake pipe for the body of the measurement apparatus use only in some cases. The member 7 may be used both as the main passage 8 and an air cleaner or duct or throttle body etc. in other cases.

An insertion hole 15 for positioning a measuring module (the module comprising of the detecting elements such as the heating resistor 1 and the thermo-sensitive resistor 2, the sub-passage 4, housing 6 and others) to inside of the main passage 8 is provided at the wall of the main passage member 7. The measuring module is provided by fixing the housing 6 at the main passage member 7 with a screw or the like. Thus, the amount of the intake air passing through the main passage can be measured.

In the case of an air flow measurement apparatus without the above-mentioned leak hole 407, if water from the outside enters to sub-passage 4, water may remains in the sub-passage 4, depending on the installation angle.

Figure 4:
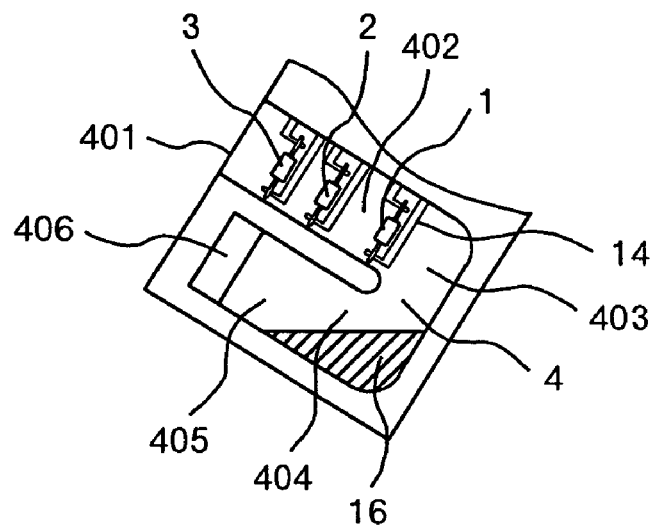
FIG. 4 is an explanatory diagram of a gas flow measuring apparatus as a comparative example, showing how water remains in the sub-passage without a leak hole.

FIG. 4 shows how water remains.

FIG. 4 shows a circuitous sub-passage 4 without a leak hole. It represents the case where the air flow measurement apparatus is installed when water is likely to remain in the second bent portion 404 (passage bend angle).

In this case, water entering the sub-passage 4 remains close to the second bent portion 404. Since the sectional area of the sub-passage 4 is reduced close to water area 16, there is an increase in the resistance to air flow in the sub-passage 4, and there is a decrease in the amount of air flowing through the sub-passage 4 (the air flow rate of the main passage is increased and the air flow rate of the sub-passage is decreased, even if the flow of air to be measured is the same). Thus, a large negative error occurs in the air flow rate measured by the air flow measurement apparatus.

If the amount of the remained water increases by accumulating according to the shape or the installation angle of the sub-passage, the sub-passage 4 will be partially blocked with water. Thereby the air can not flow into the sub-passage 4, and the air flow cannot be measured. That is, it is also possible that the air does not pass through the sub-passage 4, and the output to indicate the air flow rate becomes zero due to error.

Further it is also possible that, if detecting elements 1, 2 and 3 are soaked in water, a serious measurement error occurs and the detecting elements 1, 2 and 3 are damaged by corrosion and electrolytic corrosion, thereby the measurement is disabled.

Figure 5:
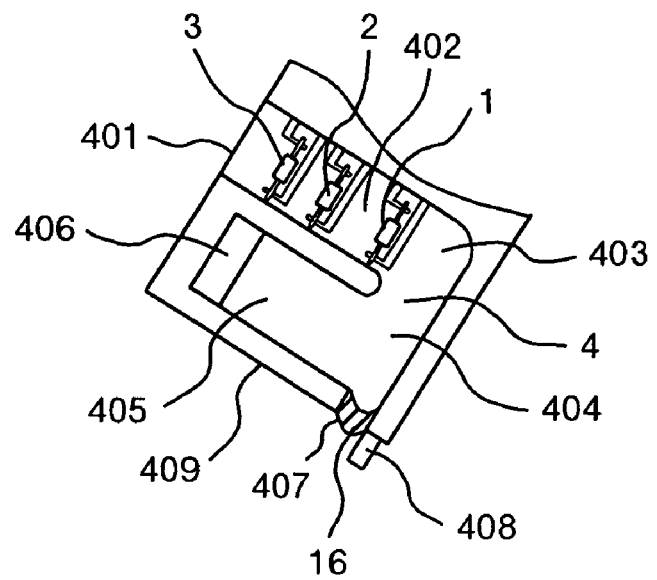
FIG. 5 is an explanatory diagram representing how water remains in the sub-passage with a leak hole.

By contrast, in the case of a sub-passage 4 with leak hole 407, water entering the sub-passage 4 flows out through the leak hole 407 as shown in FIG. 5. Thus, the situation where the flow of air in the sub-passage 4 is shut off can be prevented. According to the installation angle and shape of the sub-passage 4A, plural leak holes 407 may be provided at the position where water may remain.

When the amount of water entering the sub-passage 4 is much reduced as shown in FIG. 5, the surface tension in the leak hole allows water to remain in the state of waterdrop 16 or water film. When the amount of water 16 is increased, it gets stronger than the surface tension, and water flows out through the leak hole 407. In this case, water also remains in the state of waterdrop or water film when the amount of water becomes very little.

As described above, in the sub-passage 4 provided with a leak hole 407, water does not remain so much that it hinders the flow of air in the sub-passage 4 even if water enters to the sub-passage 4. However, the leak hole 407 is blocked by water 16. In this case, there is no leakage of air flowing out of the sub-passage (main passage) through the leak hole 407. Accordingly, there is a change in the flow of air in the sub-passage 4 as compared to the case where the leak hole 407 is not blocked by water. Such a situation causes an error in air flow measurement.

In this embodiment, such an air flow measurement error can be reduced as follows.

The position close to the second bent portion 404 in the sub-passage 4 (close to the opening of the leak hole 407 on the internal surface of the sub-passage) is an area where dynamic pressure is generated. The pressure in the area is comparatively high in the sub-passage 4. On the other hand, the position close to the opening of the leak hole 407 on the external surface of the sub-passage belongs to the low pressure area due to the velocity of the main flow 13 along the external wall of the sub-passage if there is no dynamic pressure plate 408. However, in case of providing a dynamic pressure plate 408, dynamic pressure is generated. Thereby, since the pressure difference between the opening of the leak hole 407 on the external surface of the sub-passage and the area close to the second bent portion 404 is almost equivalent, the air leakage in the sub-passage 4 is decreased effectively even if the leak hole 407 is not blocked by water.

Accordingly, since there is not much change in the distribution of the air flow between the case where the leak hole 407 is blocked with water and the case where it is not blocked, air flow measurement errors are minimized.

Figure 6:
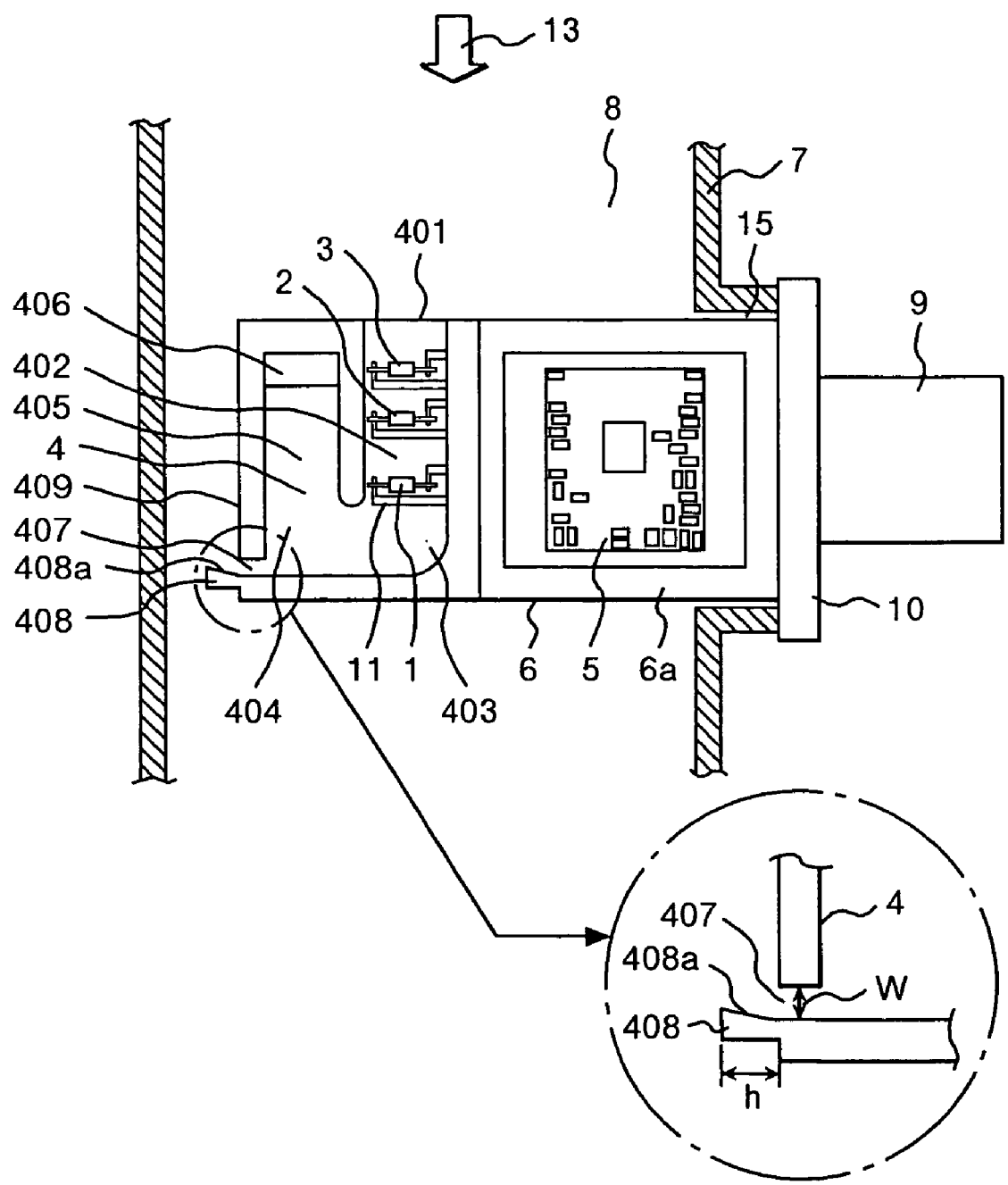
FIG. 6 is a transverse cross sectional view and its partially enlarged view representing another form of the first embodiment.

In FIG. 1, the dynamic pressure plate 408 is formed so that the surface 408a facing toward the upstream (air inlet side) of the main passage 8 is perpendicular to the main flow 13. However, instead of it, as shown in FIG. 6, the surface 408a facing toward the upstream of the main passage 8 may incline toward the direction of forming an acute angle to the external surface of the sub-passage (direction of facing slightly toward the side of the leak hole 407). Thus, dynamic pressure can be generated effectively to the opening of the leak hole 407 on the external surface of the sub-passage by forming an inclined surface on the dynamic pressure plate 408.

In case of the dynamic pressure plate 408 in FIG. 6, even if the height "h" of the plate 408 is shorter than that of the dynamic pressure plate 408 in FIG. 1, it can generate the dynamic pressure equivalent to the plate of FIG. 1. In case of the embodiment in FIG. 6, the optimum value of the height "h" of the dynamic plate can be set to 0.5 through 2.0 mm when the short side of the leak hole 407 is 2 mm.

The advantage of the dynamic pressure plate 408 of the present embodiment will be described with reference to the flow analysis result given in FIGS. 7 through 10.

Figure 7:
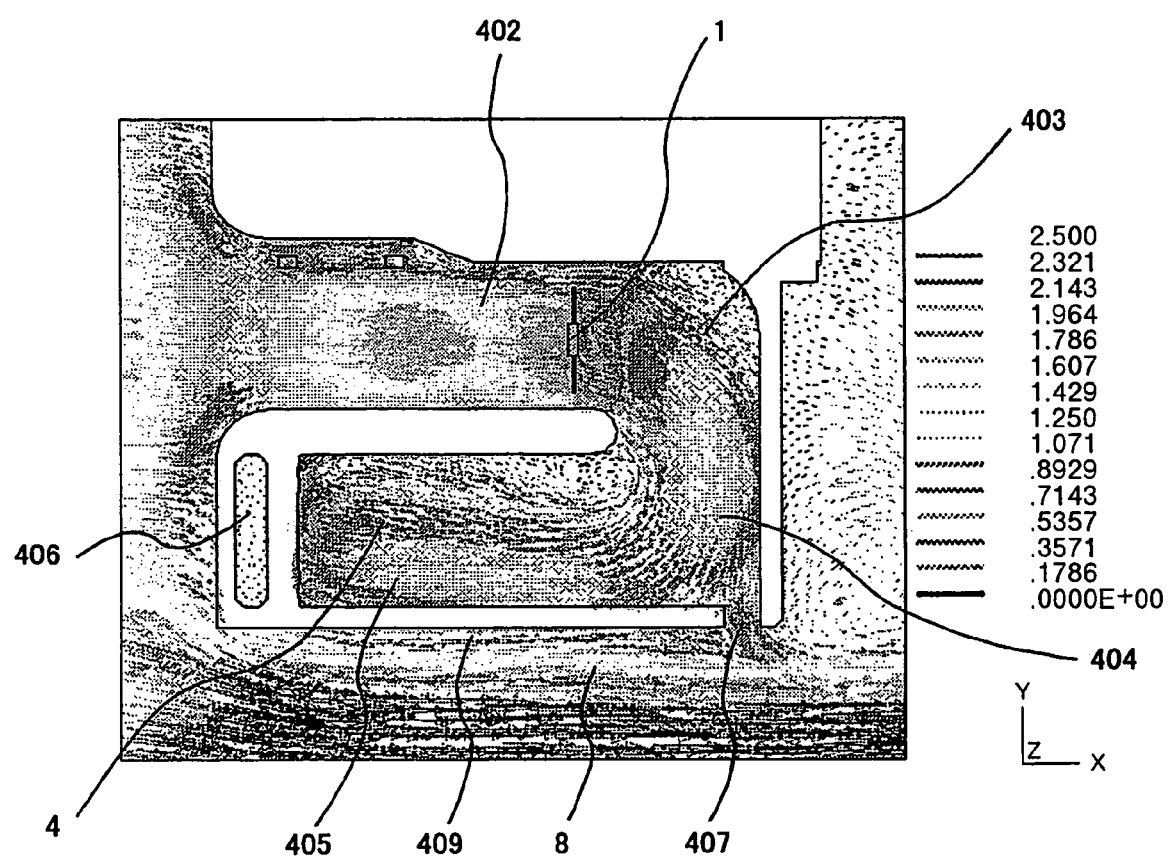
FIG. 7 is a diagram representing the flow velocity vector of the sub-passage without dynamic plate.

FIG. 7 is a diagram representing the flow velocity vector in the comparative example of the sub-passage 4 (although it has the leak hole 407 but it does not have the dynamic pressure plate 408). It shows the result of the flow analysis when the average flow velocity of the main passage (main flow) is 2 m/s. In this case, the flow of velocity of 1 m/s or more occurs in the area ranging from the leak hole 407 to the main passage.

Figure 8:
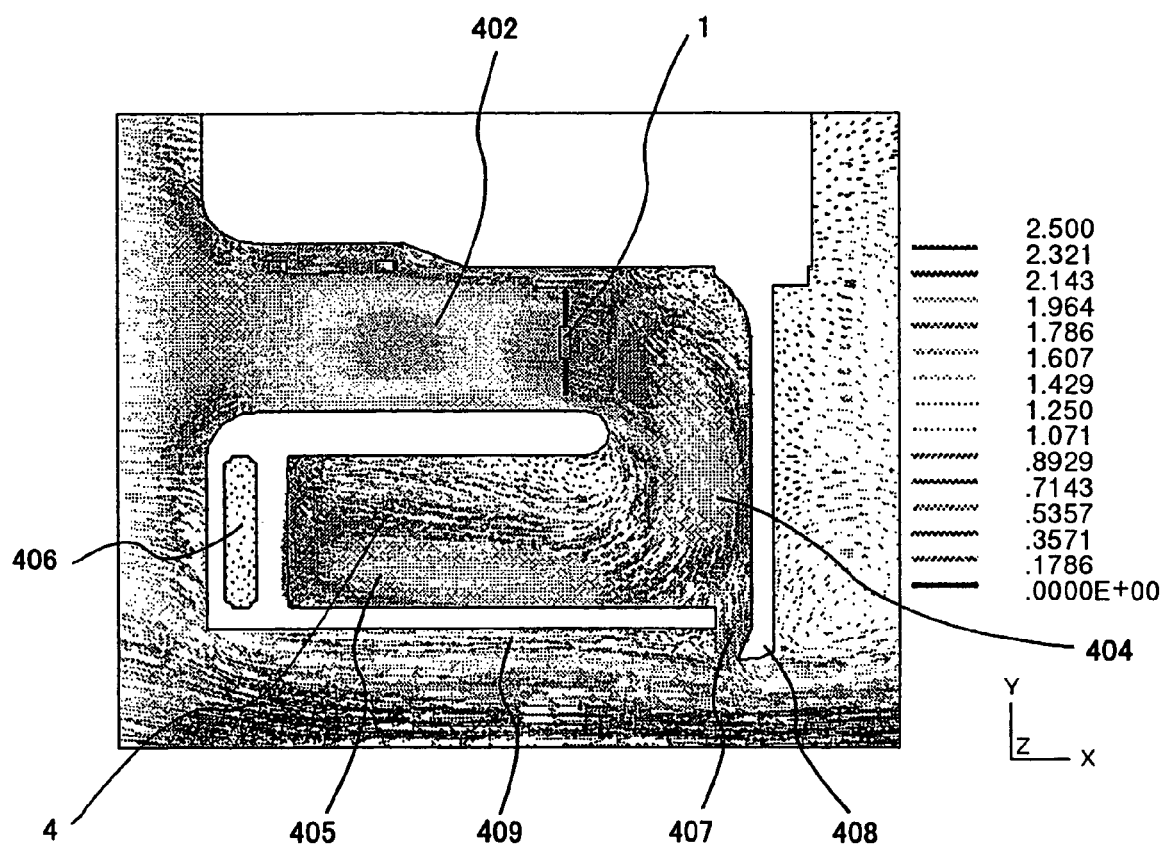
FIG. 8 is a diagram representing the flow velocity vector of the sub-passage provided with dynamic plate.

FIG. 8 is a diagram representing the flow velocity vector in the sub-passage 4 provided with the dynamic plate 408 of the present invention (the plate 408 whose surface facing the upstream side of the main flow forms an inclined surface), FIG. 8 is drawn by the graph corresponding to FIG. 6.

In this case, the pressure difference on the openings of the leak hole 407 on the internal surface and the external surface of the sub-passage, namely both ends of the leak hole 407, can be reduced by the function of the dynamic pressure plate 408. Thereby, the flow velocity of air flowing out from the leak hole 407 is reduced below 0.5 m/s.

Figure 9:
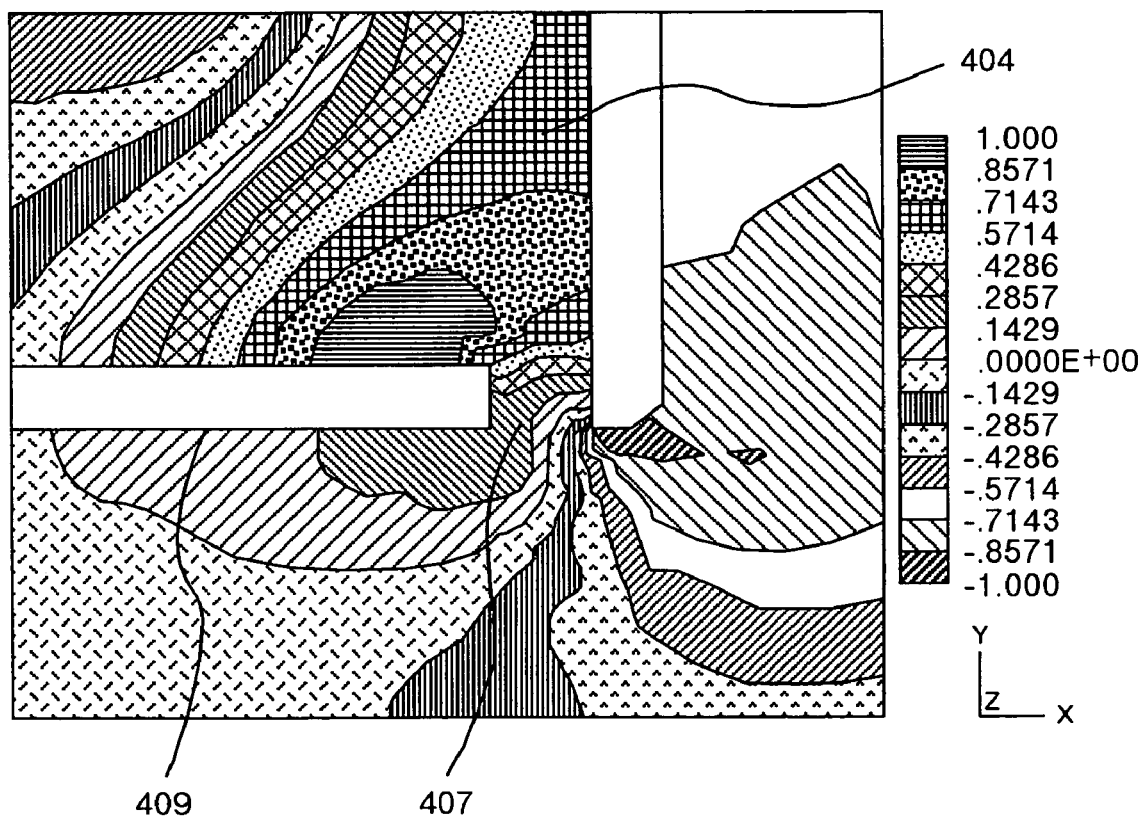
FIG. 9 is a diagram representing the pressure distribution of the sub-passage without dynamic plate.
Figure 10:
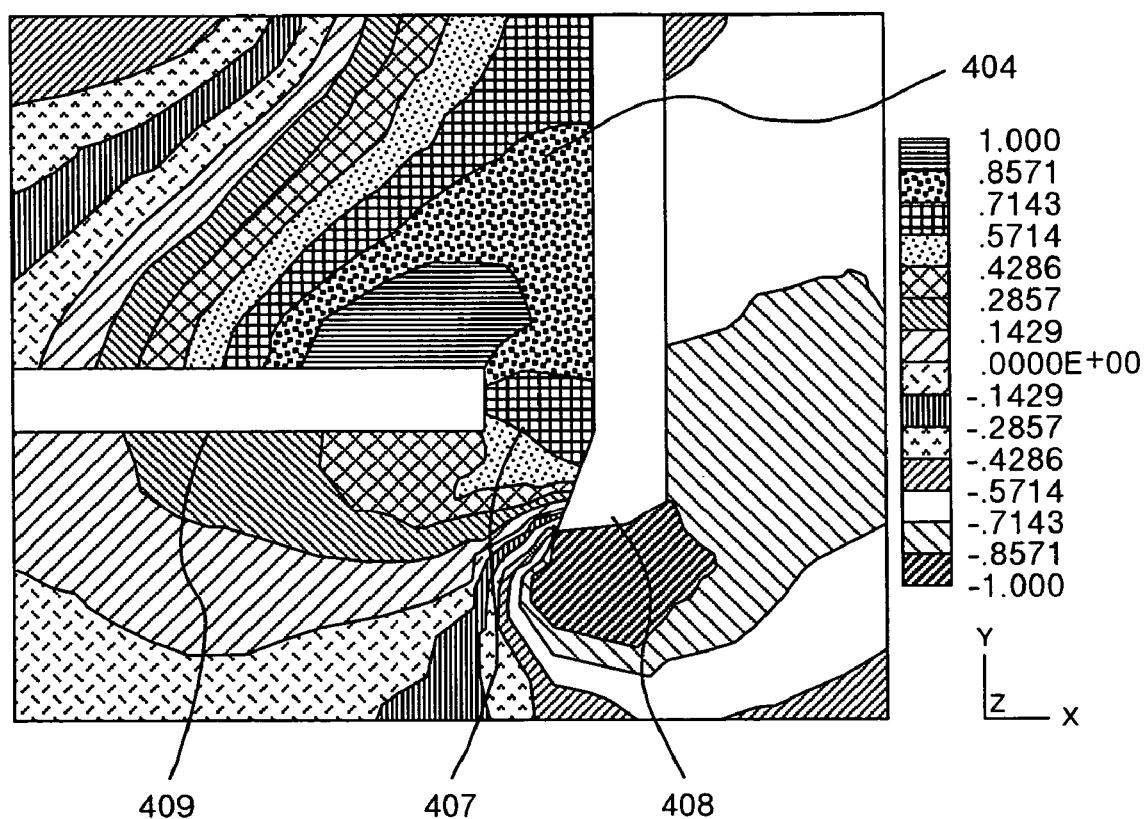
FIG. 10 is a diagram representing the pressure distribution of the sub-passage provided with dynamic plate.

FIG. 9 is a diagram representing the pressure distribution inside and outside the sub-passage surrounding the leak hole 407 in the comparative example given in FIG. 7. FIG. 10 is a diagram representing the pressure distribution inside and outside the sub-passage surrounding the leak hole 407 in the embodiment given in FIG. 8. FIGS. 9 and 10 show the result of the flow analysis when the average flow velocity in the main passage is 2 m/s.

As shown in FIG. 9, when the leak hole 407 is not provided with the dynamic plate, the pressure on the opening 4 of the leak hole 407 on the internal surface of the sub-passage is negative. The pressure difference on the openings of the leak hole 407 on the internal surface and the external surface of the sub-passage 4 is 0.5 Pa or more.

On the other hand, in FIG. 10, the dynamic pressure is generated on the opening of the leak hole 407 on the external surface of the sub-passage, by the dynamic pressure plate 408. Thereby, the pressure on the opening is increased. That is, the dynamic pressure is generated in response to the air flow close to the side wall 409 of the sub-passage by the plate 408, around the opening of the leak hole 407 on the external surface of the sub-passage. The dynamic pressure increases the pressure close to the opening of the leak hole 407 on the external surface of the sub-passage. Accordingly, the pressure difference on the openings of the leak hole 407 on the internal surface and the external surface of the sub-passage 4 is reduced below 0.2 Pa.

In such a configuration, the difference between the maximum pressure close to the opening of the leak hole 407 on the internal surface of the sub-passage and the minimum pressure close to the opening on the external surface of the sub-passage is kept at a level not exceeding the one fifth of the $u^2/2$ g. The $u^2/2$ g is a value of the dynamic pressure generated by the average flow velocity "u" of the gas to be measured.

Further, the difference between the detected flow rates where the leak hole is blocked and where not blocked can be made 2% or less.

Figure 11:
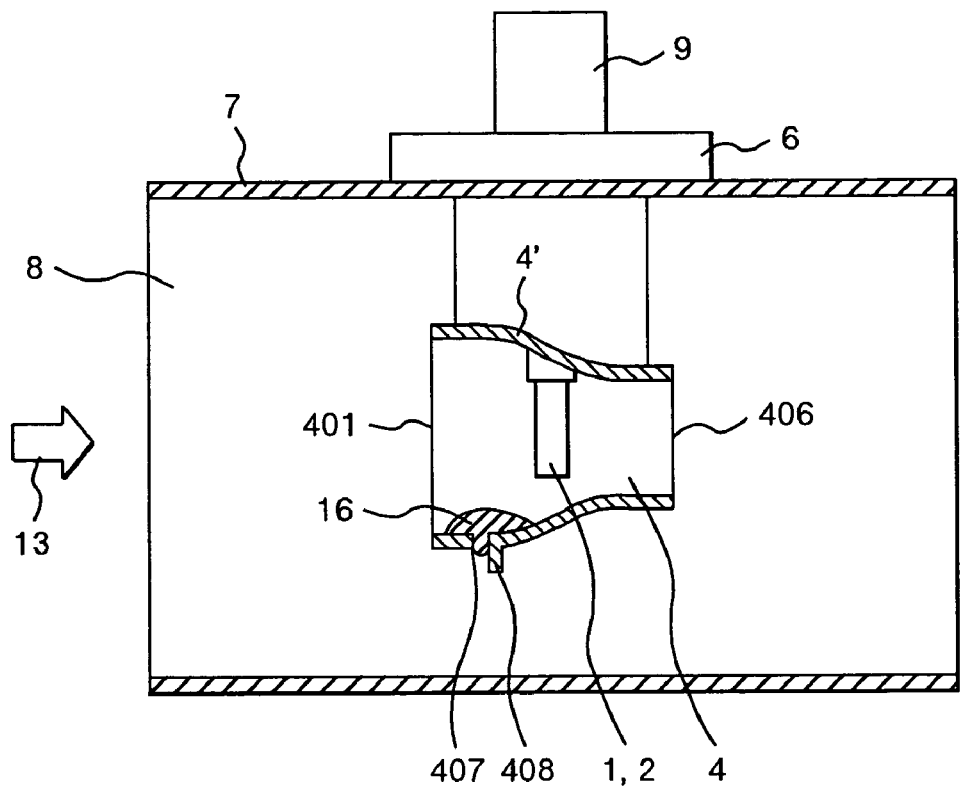
FIG. 11 is a vertical sectional view representing the second embodiment of the present invention.

The second embodiment will be described with reference to FIG. 11:

FIG. 11 is a sectional view representing a thermal resistor type air flow measurement apparatus having the sub-passage 4 which is not bent. The sub-passage 4 has a flow contraction section 4' formed between the inlet opening 401 and the outlet opening 406. The flow detecting elements 1 and 2 are set downstream from the flow contraction section 4'.

In such a sub-passage, water may remain in the flow contraction section 4', so the leak hole 407 is provided on the bottom of the section 4', and the dynamic pressure plate 408 is formed downstream from the leak hole 407.

In the air flow measurement apparatus of the present embodiment, when water has entered the sub-passage 4, the remained water area 16 is likely to be formed close to the bottom of the flow contraction section 4' in some cases, if there is no leak hole 407. The remained water area 16 may hinder air flow. It may change the flow distribution of the flow velocity at the location of the flow detecting elements 1 and 2, or may affect the flow division ratio of the sub-passage 4.

In the present embodiment, accumulating of water in the sub-passage 4 can be avoided by the leak hole 407. When the leak hole 407 is blocked by the waterdrop or the water film, the flow measurement error may occur. However, according to the same dynamic pressure generation principle as that of the aforementioned embodiment, there is not much change in the distribution of air flow velocity between the cases where the leak hole is blocked and where not blocked. This arrangement can reduce air flow measurement errors.

Figure 12:
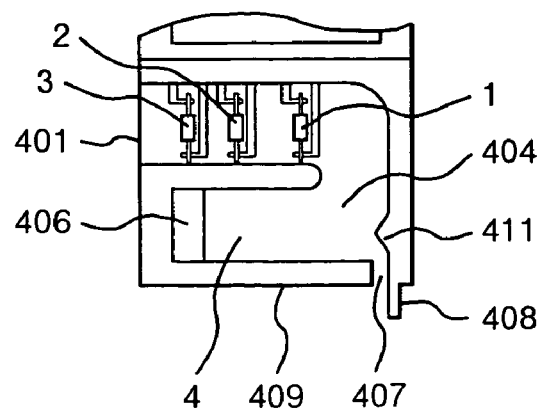
FIG. 12 is a partial side view representing the internal structure of the sub-passage of a gas flow measuring apparatus as a third embodiment of the present invention.

FIG. 12 is a partial cross section representing a third embodiment of the present invention. The basic configuration of the air flow measurement apparatus is the same as that given in FIG. 1. Namely, in the present embodiment, similarly to the embodiment given in FIG. 1, the heating resistor 1, the thermo-sensitive resistor 2 and the intake temperature measuring element 3 are fixed to the terminal 11 so that they are located inside the sub-passage 4, and are electrically connected with the electronic circuit 5. The sub-passage 4, the electronic circuit 5, the connector 9, the housing 6, the cover 12 and the main passage 8 are omitted in FIG. 11.

The major shape of the sub-passage 4 is the same as that of FIG. 1. The leak hole 407 and the dynamic pressure plate 408 are provided.

In the present embodiment, in addition to the above, a protrusion 411 having a triangular cross section (angular form) is provided close to the position upstream from the leak hole 407 in the sub-passage 4. The protrusion 411 has inclinations that faces upstream and downstream of the sub-passage 4. The protrusion 411 may have one inclination. The protrusion 411 deflects the flow of air passing through the sub-passage 4. This is called the deflecting protrusion 411.

The deflecting protrusion 411 is formed on the internal surface close to the second bent portion 404 in the sub-passage 4. In other words, here, when the upstream and the downstream in the sub-passage are defined on the basis of the opening of the leak hole 407 on the internal surface of the sub-passage, the deflecting protrusion 411 is formed upstream from the opening. The protrusion 411 is close to the opening of the leak hole 407 on the internal surface of the sub-passage.

Accordingly, the direction of the air flowing in the sub-passage 4 close to the wall surface of the deflecting protrusion 411 is further changed toward the outlet opening 406 of the sub-passage. Thus, the area close to the opening of the leak hole 407 on the internal surface of the sub-passage becomes an area for separating the air flow from the internal surface. Thereby, the pressure of that area is reduced.

As a result, in addition to the aforementioned function of the dynamic pressure plate 408, the pressure close to the opening of the leak hole 407 on the internal surface of the sub-passage becomes almost equal to the pressure close to the opening on the external surface of the sub-passage. Thereby, the air flow which flows through the sub-passage, when the leak hole 407 is blocked and when not blocked, is maintained at the almost same state. Accordingly, the measurement errors, that may be caused by water 16 in the form of the waterdrop and the water film remaining in the leak hole 407, can be reduced.

Figure 13:
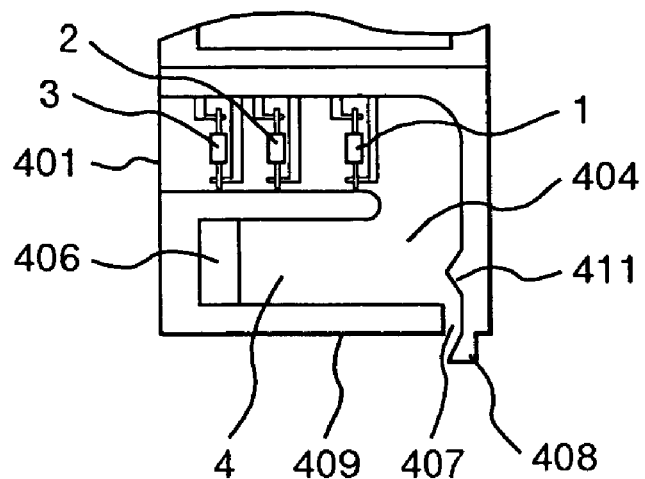
FIGS. 13 and 14 are partial side views representing the internal structure of the sub-passage as another form of the third embodiment.

FIG. 13 shows another form of the embodiment given in FIG. 12. The difference from FIG. 12 is that the dynamic pressure plate 408 is provided with an inclined surface similar to the one given in FIG. 6.

Figure 14:
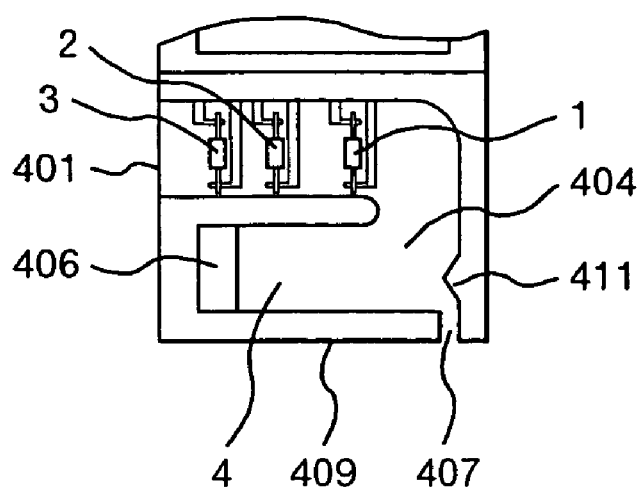

FIG. 14 also shows another form of the embodiment given in FIG. 12. The difference from FIG. 12 is that the dynamic pressure plate 408 is not provided, and only the deflecting protrusion 411 is used to reduce the pressure close to the opening of the leak hole 407 on the internal surface of the sub-passage. Thereby this pressure approaches the level of the pressure close to the opening of the leak hole 407 on the external surface of the sub-passage.

The effect of the deflecting protrusion 411 in the present embodiment will be described with reference to the flow analysis result given in FIGS. 15 through 18.

Figure 15:
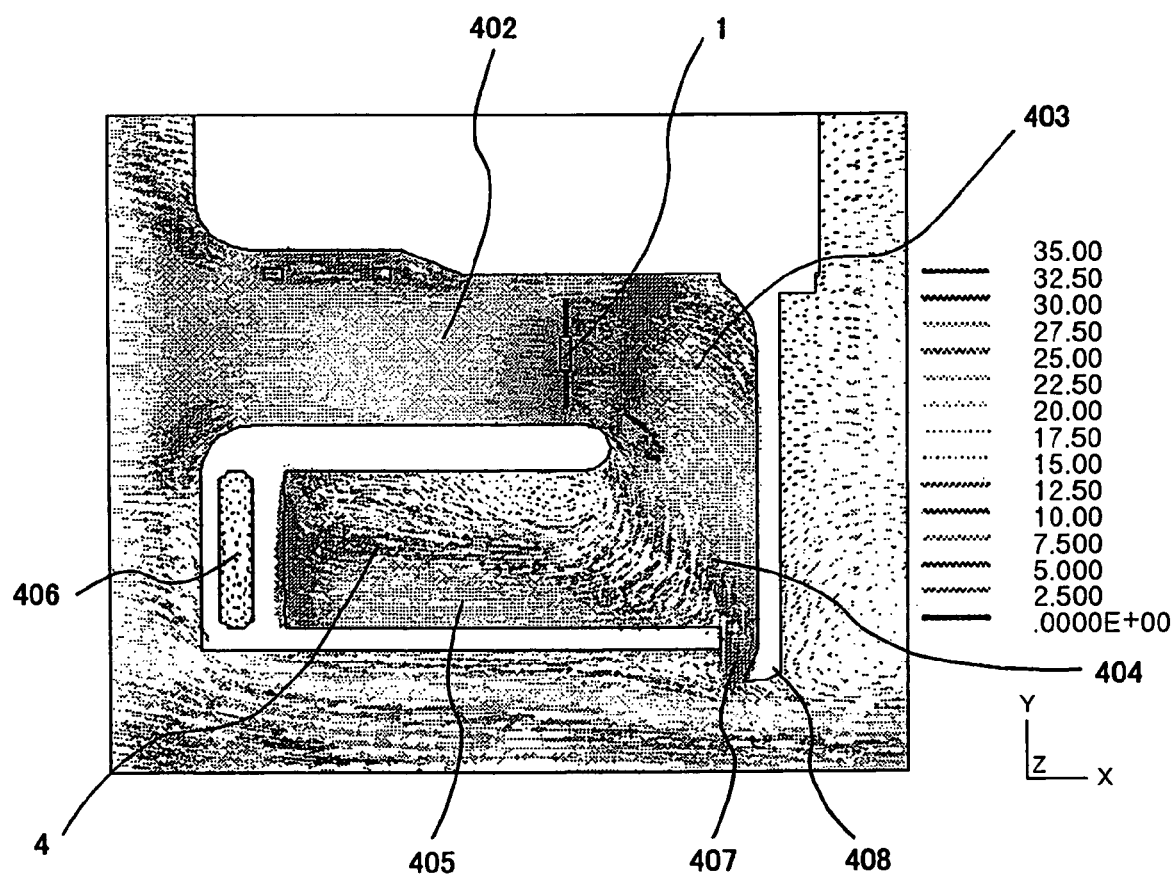
FIG. 15 is a diagram representing the flow velocity vector of the sub-passage without deflecting protrusion as a comparative example of the third embodiment.

FIG. 15 is a diagram representing the flow velocity vector in the sub-passage, wherein the sub-passage 4 is used for the air flow measurement apparatus of the embodiment of FIG. 6 (the sub-passage is provided with the leak hole 407 and the dynamic pressure plate 408, but not with a deflecting protrusion 411). It is represented in the form of a cross section parallel to the main flow, and shows the result of the flow analysis when the average flow velocity of the main passage is 25 m/s.

Figure 16:
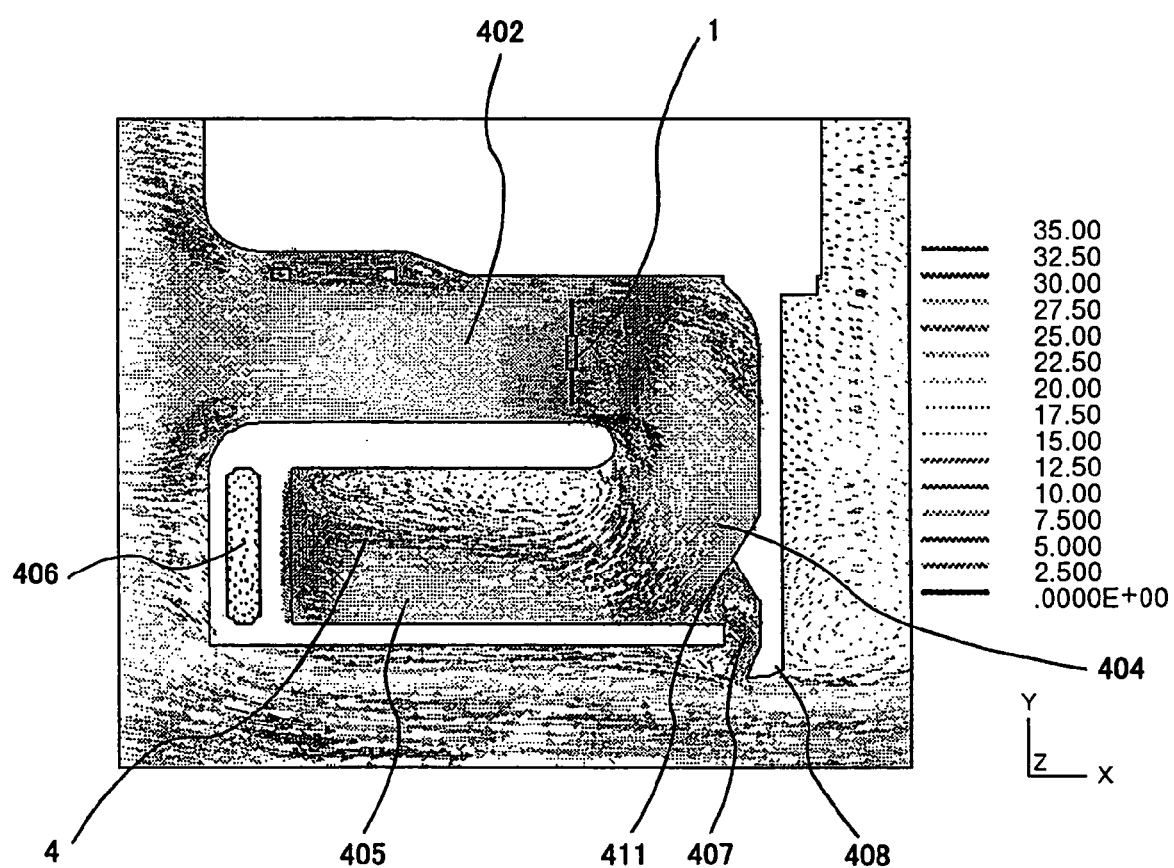
FIG. 16 is a diagram representing the flow velocity vector of the sub-passage with deflecting protrusion in the third embodiment.

FIG. 16 is a diagram representing the flow velocity vector in the sub-passage, wherein the sub-passage 4 is used for the air flow measurement apparatus of the embodiment given in FIG. 13 (provided with the leak hole 407, the dynamic pressure plate 408 and the deflecting protrusion 411). It is represented in the form of a cross section parallel to the main flow, and shows the result of flow analysis when the average flow velocity of the main passage is 25 m/s.

As shown in FIG. 15, when there is no deflecting protrusion 411, the velocity of the fluid flowing out from leak hole 407 is on the order of 15 m/s even when the advantage of the dynamic pressure plate 408 is utilized. By contrast, when the deflecting protrusion 411 is provided, the velocity of the fluid flowing out from the leak hole 407 is reduced to about 7 m/s. This ensures a further reduction of the flow measurement errors even when a leak hole is provided.

Figure 17:
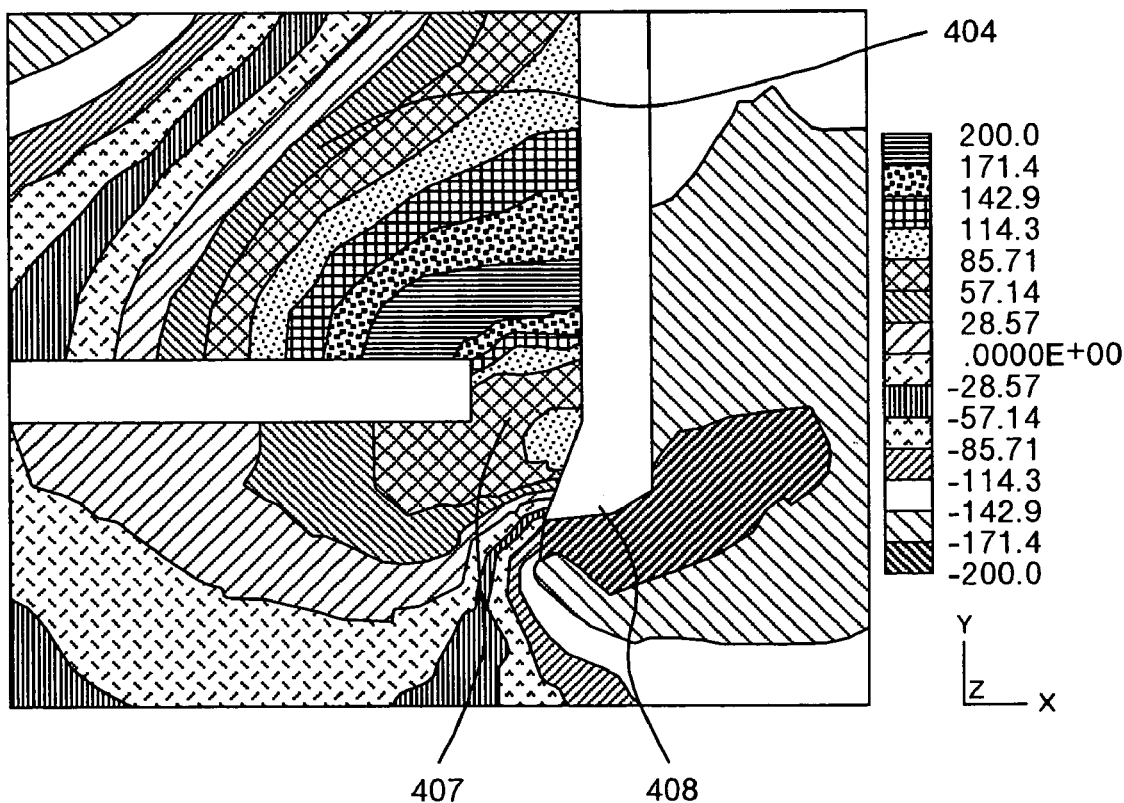
FIG. 17 is a diagram representing the pressure distribution of the sub-passage without deflecting protrusion.
Figure 18:
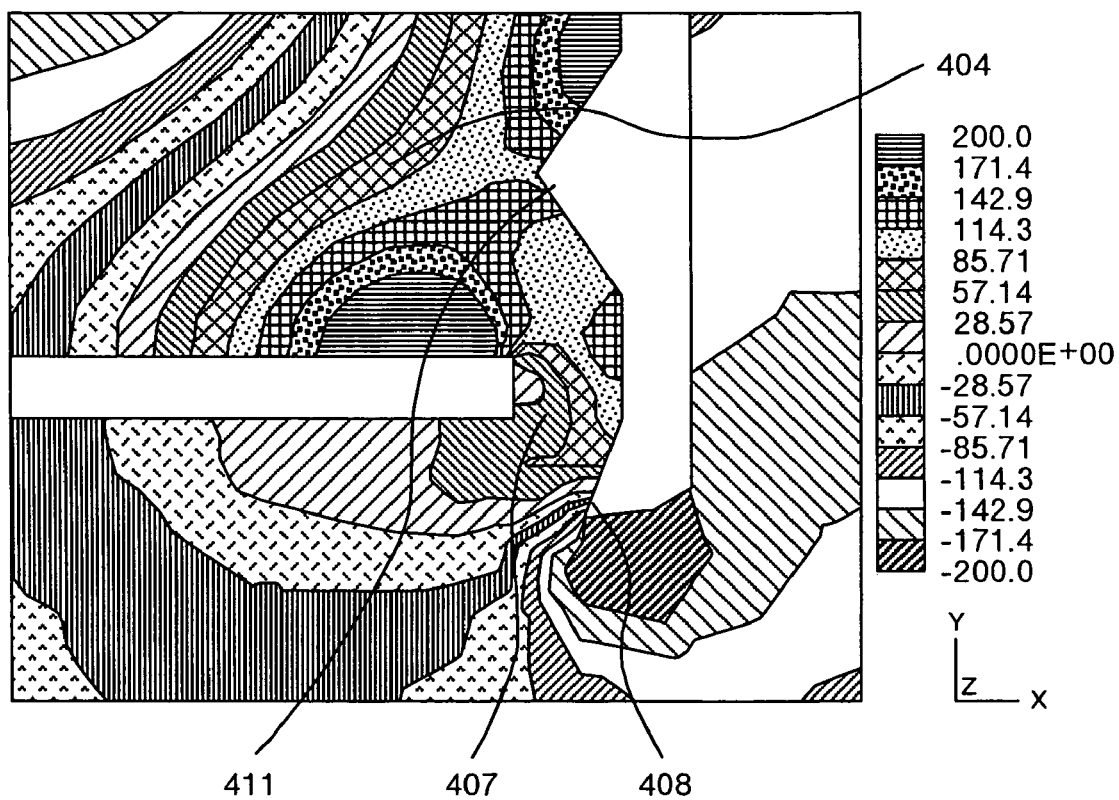
FIG. 18 is a diagram representing the pressure distribution of the sub-passage with deflecting protrusion.

FIG. 17 is a diagram representing the pressure distribution around the leak hole 407 of the sub-passage 4 in the air flow measurement apparatus given in FIG. 15. FIG. 18 is a diagram representing the pressure distribution around the leak hole 407 of the sub-passage 4 in the air flow measurement apparatus given in FIG. 16. They show the result of the flow analysis when the average flow velocity of the main passage is 25 m/s.

As shown in FIG. 17, when the deflecting protrusion 411 is not provided, the pressure difference between the openings of the leak hole 407 on the internal surface and external surface of the sub-passage 4 is 40 Pa or more. As shown in FIG. 18, when a deflecting protrusion 411 is provided upstream from the leak hole 407 in the sub-passage 4, the pressure close to the opening of the leak hole 407 on the internal surface of the sub-passage is reduced. The pressure difference between the openings of the leak hole 407 on the internal surface and the external surface of the sub-passage is on the order of 25 Pa.

The aforementioned embodiments intend to minimize the flow measurement error even when water remains in the leak hole 407 due to the surface tension and others, and even when the leak hole is blocked.

Figure 19:
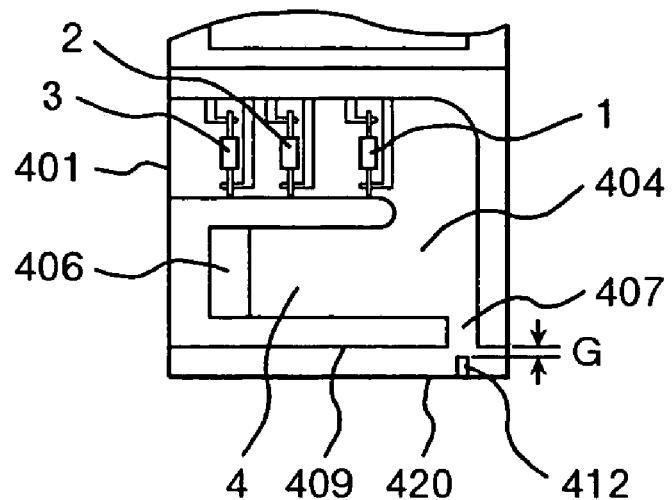
FIG. 19 is a partial side view of a gas flow measuring apparatus as a fourth embodiment of the present invention.

In the embodiments of FIG. 19 and thereafter, they describe a structure for eliminating liquid films from the leak hole. These embodiments actively prevent water from remaining in the leak hole 407 due to surface tension and others, so the flow measurement errors will not occur due to the leak hole being blocked.

Figure 20:
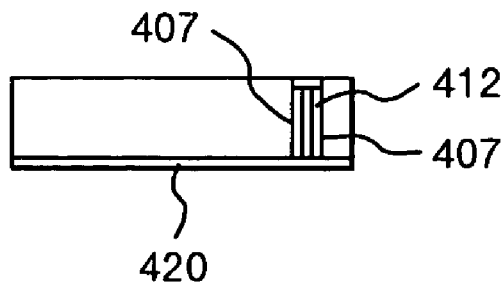
FIG. 20 is a bottom view of the same.

FIG. 19 is a cross section showing the major portion of an air flow measurement apparatus as a fourth embodiment of the present invention. The electronic circuit 5, the connector 9, the housing 6, cover 12 and main passage 8 as shown in FIG. 1 are omitted. They have the same configuration as those of the aforementioned embodiments. FIG. 20 shows the bottom view thereof.

The arrangements of the flow detecting elements such as heating resistor 1 etc. and overall profile of the sub-passage 4 in the present embodiment are the same as those of the embodiments described with reference to FIGS. 1 through 18, so they will be omitted in the following description to avoid duplication.

In the present embodiment, a means for preventing the liquid film being formed on the opening by surface tension is provided close to the opening of the leak hole 407 on the external surface of the sub-passage.

A plate-formed member 412 (or a rod-formed member) facing this opening, for example, is used as the liquid film preventing means. It is located at a position just coming out of the opening of the leak hole 407 on the external surface of the sub-passage.

The plate-formed member 412 is integrally formed with a protrusion piece 420 additionally provided on the bottom 409 of the sub-passage 4. The protrusion piece 420 is formed integrally with the sub-passage 4 so that it extends at a long side of the body of the sub-passage 4. The plate-formed member 412 is also intersects at right angles with the protrusion piece 420.

The plate-formed member 412 (or the rod-formed member) is located on the extension approximately of the center line of the opening of the leak hole 407 on the external wall surface of the sub-passage.

Further, a gap G is provided between the end plane of the plate-formed member 412 and the opening of the leak hole 407 on the external surface of the sub-passage. This is because the liquid film cannot be removed from the leak hole 407, if the end of the plate-formed member 412 has reached the opening of the leak hole 407 on the external surface of the sub-passage or it is inserted into the leak hole beyond the opening. Since a certain gap G is kept between the opening of the leak hole 407 on the wall surface of the sub-passage and the end of the plate-formed member 412, it is easy to break the liquid film as follows. That is, since the waterdrop comes into contact with the protrusion 412 as it hangs down from the outlet side opening of the leak hole 407, the waterdrop breaks easily.

When water has accumulated in the sub-passage 4, the leak hole 407 drains water away to the outside. In the case of a leak hole having the hole size that does not deteriorate the function of the sub-passage 4, water in the form of waterdrop and water film remains in the leak hole 407, as shown in FIG. 5. The flow of air through the sub-passage is affected, as compared to the case where no water remains, and measurement errors will occur, as described earlier.

In the present embodiment, when the waterdrop have grown in the leak hole 407, its surface contacts the plate-formed member 412, and the waterdrop is pulled out toward the plate-formed member by the contact angle of the waterdrop to the surface of the plate-formed member 412. Therefore, the waterdrop large enough to block the leak hole 407 comes in contact with the plate-formed member 412 and tends to come out along the plate-formed member 412. Accordingly, it is possible to prevent water from remaining in the leak hole 407.

Figure 21:
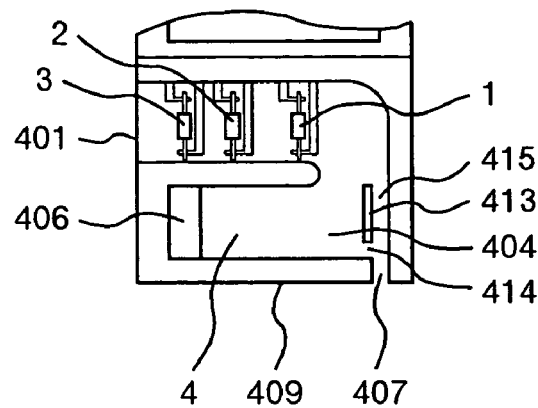
FIG. 21 is a partial side view of a fifth embodiment of the present invention.

FIG. 21 shows an embodiment that provides a structure for preventing the water film and the water drop in the leak hole 407, similarly to FIG. 19.

In the present embodiment, a partition wall 413 is formed integrally with the sub-passage 4. The partition wall 413 separates the flow of gas around the second bent portion 404 of the internal surface of the sub-passage 4, and leads part of the flow to the leak hole 407.

The separated passage 415 formed by the partition wall 413 and the internal surface of the sub-passage 404 is located upstream from the leak hole 407. The partition wall 413 ends immediately before the leak hole 407, and the ended portion 414 communicates with the second bent portion 404. The ended portion 414 allows smooth feeding of water through the separated passage 415 formed by the partition wall 413, thereby leading it to the leak hole 407.

According to the aforementioned configuration, the partition wall 413 separates part of air flowing through the sub-passage 4, and leads the flow of air straight into the leak hole 407, whereby dynamic pressure is generated on the opening of the leak hole 407 on the internal surface of the sub-passage. In particular, the upstream end of the partition wall 413 is located so as to face the bent portion having a higher pressure in the sub-passage 4. This configuration can further increase the pressure generated on the opening of the leak hole 407 on the internal surface of the sub-passage.

As described above, the leak hole 407, having a small opening area without affecting the function of the sub-passage 4, allows the waterdrop and the water film to drain to the outside by the pressure generated on the opening of the leak hole 407 on the internal surface. Since the leak hole is open at all times (without being blocked by liquid), it is possible to prevent the flow measurement errors that may be caused by change of gas flow resulting from the leak hole being blocked.

Figure 22:
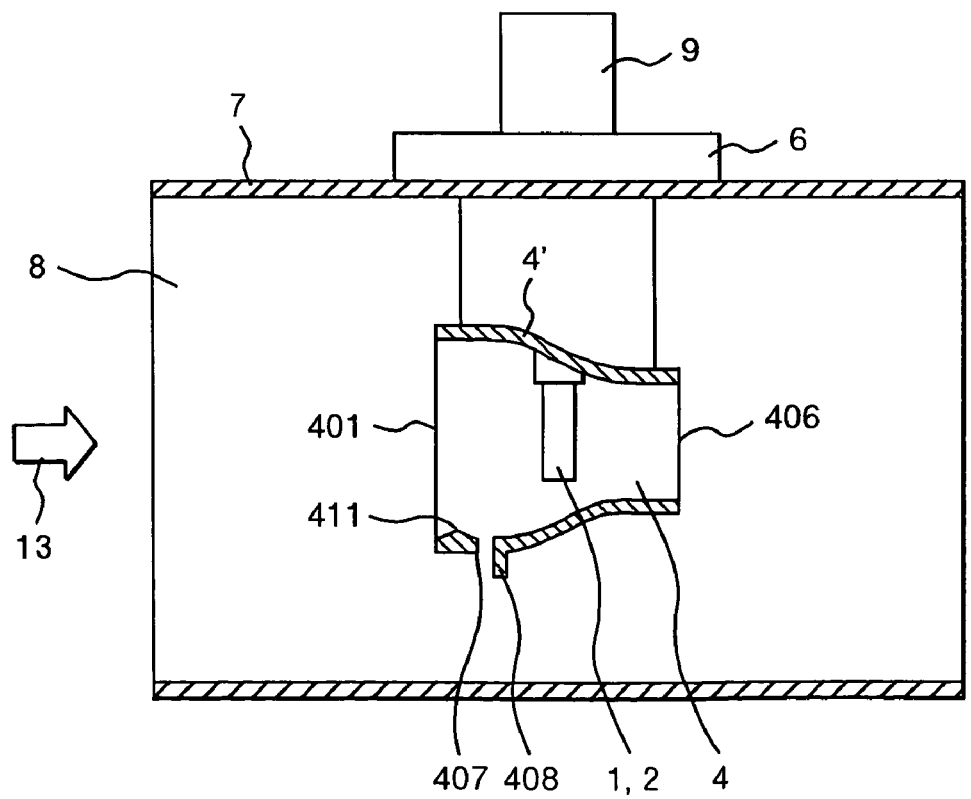
FIG. 22 is a vertical sectional view representing a sixth embodiment of the present invention.

FIG. 22 shows an embodiment wherein a deflecting protrusion 411 and the dynamic pressure plate 408 are formed onto the flow measurement apparatus having the same configuration as that of FIG. 11. In such a configuration, the direction of air flowing through the sub-passage 4 close to the leak hole 407 is changed toward the center of the sub-passage 4, similarly to the case of the embodiment described with reference to FIG. 11. Thus, the portion close to the opening of the leak hole 407 on the internal surface becomes an exfoliation flow area, where the pressure is reduced, accordingly the pressures inside and outside the leak hole 407 are almost the same with each other. This configuration allows almost the same flow to be kept between the cases where the leak hole 407 is blocked and where not blocked. Thereby the measurement errors, that may be caused by the waterdrop and the water film remaining in the leak hole 407, are reduced.

If the area around the leak hole of the aforementioned sub-passage, the protrusion, the plate- or the rod-formed member or the partition wall for generating the dynamic pressure or the exfoliation area has a surface coarser than other portions, the following effect can be expected. According to the configuration, since the contact angle of liquid on their surface is reduced, water can be easily drained from the leak hole.

In the aforementioned embodiments, we could get preferable results when the diameter of the leak hole 407 or the length of the short side was 0.5 through 2 times the height of the liquid drop produced by the surface tension of the liquid such as water entering the sub-passage.

INDUSTRIAL FIELD OF APPLICATION

The present invention can prevent water from remaining in the sub-passage by making water drain through the leak hole, even if water tends to accumulate due to entering into the sub-passage or due to condensing inside the sub-passage. Further, the present invention reduces a flow measurement error, independently of whether or not the leak hole is blocked by a liquid film or liquid drop (adhering to the leak hole without remaining in the sub-passage) formed therein. Or the invention prevents the liquid film such as water film from accumulating in the leak hole at all times, thereby reducing the flow measurement error and improving the flow measurement accuracy. Moreover, the present invention provides such advantages without affecting the cost, size, weight and others.

What is claimed is:

1. A gas flow measurement apparatus comprising a main passage for making a gas flow, a sub-passage for making part of the gas flow, and gas flow detecting elements which are provided at said sub-passage for detecting a gas flow rate;

said gas flow measurement apparatus characterized in that a through hole between the internal surface and the external surface of said sub-passage is provided en route from the inlet of the said sub-passage to the outlet thereof; the openings of said through hole are located on the internal surface and the external surface of said sub-passage so as to make adhesion water on the internal surface of said sub-flow passage flow outside said sub-passage, and a structural means for reducing the amount of the leak gas passing through said through hole is provided on at least one of the sub-passage internal surface immediately upstream of the through hole and the sub-passage external surface immediately downstream of the through hole.

2. The gas flow measurement apparatus according to claim 1, wherein
said through hole is a drain hole for draining such a liquid as water having entered said sub-passage.

3. The gas flow measurement apparatus according to claim 1, wherein
said sub-passage contains at least one bent passage portion, and said through hole is arranged close to the bent passage portion.

4. The gas flow measurement apparatus according to claim 3, wherein
said sub-passage is formed in a U-like configuration and said through hole is provided in the corner of the bent passage portion or in its vicinity.

5. The gas flow measurement apparatus according to claim 1, wherein
said through hole is a slit having the length approximately the same as the width of said sub-passage.

6. The gas flow measurement apparatus according to claim 1, wherein
the diameter of said through hole or the length of the short side of said through hole is 0.5 through 0.2 times the height of the liquid drop produced by the surface tension of the liquid such as water entering said sub-passage.

7. The gas flow measurement apparatus according to claim 1, wherein at least one of the surrounding area of said through hole of said sub-passage, said obstacle, said deflecting structure, said plate-formed member, said rod-formed member and said partition wall has a surface coarser than other portions.

8. The gas flow measurement apparatus according to claim 7, wherein said coarse surface is formed of numerous fine grooves.

9. A thermal resistor type air flow measurement apparatus for measuring the intake air flow rate in an internal combustion engine, characterized by the configuration described in claim 1.

10. An internal combustion engine control system comprising a thermal resistor type air flow measurement apparatus according to claim 9.

11. A gas flow measurement apparatus comprising a main passage for making a gas flow, a sub-passage for making part of the gas flow, and gas flow detecting elements which are provided at said sub-passage for detecting a gas flow rate;

said gas flow measurement apparatus characterized in that a through hole between the internal surface and the external surface of said sub-passage is provided en route from the inlet of the said sub-passage to the outlet thereof, and a structure for generating a dynamic pressure on the opening of said through hole on the external surface of said sub-passage at the time of a forward flow of the gas in said main passage is provided in the vicinity of said opening.

12. The gas flow measurement apparatus according to claim 11, wherein when the upstream and the downstream of the main gas flow in said main passage is defined on the basis of the position of the opening of said through hole on the external surface of said sub-passage, an obstacle to said main gas flow is arranged at the downstream close to the opening of said through hole on the external surface of said sub-passage, and said dynamic pressure is generated on the opening of said through hole on the external surface of said sub-passage by said obstacle.

13. The gas flow measurement apparatus according to claim 12, wherein said sub-passage and said through hole are formed integrally with said obstacle, said deflecting structure, said plate-formed member, said rod-formed member or said partition wall by plastic molding.

14. A gas flow measurement apparatus comprising a main passage for making a gas flow, a sub-passage for making part of the gas flow, and gas flow detecting elements which are provided at said sub-passage for detecting a gas flow rate;

said gas flow measurement apparatus characterized in that:

a through hole between the internal surface and the external surface of said sub-passage is provided en route from the inlet of the said sub-passage to the outlet thereof;

when the upstream and the downstream of the main gas flow at the time of a forward flow in said main passage is defined on the basis of the position of the opening of said through hole on the external surface of said sub-passage, a protrusion composing an obstacle to said main gas flow is arranged at the downstream close to the opening of said through hole on the external surface of said sub-passage, wherein said protrusion is formed integrally with the external surface of said sub-passage; and a dynamic pressure is generated on the opening of said through hole on the external surface of said sub-passage by said protrusion at the time of a forward flow of the gas in the main passage.

15. The gas flow measurement apparatus according to claim 14, wherein the surface of said protrusion facing the upstream side of said main passage is formed perpendicularly to said main gas flow or formed in the state inclined toward the direction of forming an acute angle to the external surface of said sub-passage.

16. The gas flow measurement apparatus according to claim 14, wherein the height of said protrusion is about 0.5 through 2 times the diameter of said through hole, or the length of the short side of said through hole.

17. A gas flow measurement apparatus comprising a main passage for making a gas flow, a sub-passage for making part of the gas flow, and gas flow detecting elements which are provided at said sub-passage for detecting a gas flow rate;

said gas flow measurement apparatus characterized in that a through hole between the internal surface and the external surface of said sub-passage is provided en route from the inlet of the said sub-passage to the outlet thereof, and the difference between the maximum pressure close to the opening of said through hole on the internal surface of said sub-passage and the minimum pressure close to the opening on the external surface of said sub-passage is kept at a level not exceeding the one fifth of the $u^2/2$ g that is a dynamic pressure produced by the average flow velocity "u" of the gas to be measured.

18. A gas flow measurement apparatus comprising a main passage for making a gas flow, a sub-passage for making part of the gas flow, and gas flow detecting elements which are provided at said sub-passage for detecting a gas flow rate;

said gas flow measurement apparatus characterized in that a through hole between the internal surface and the external surface of said sub-passage is provided en route from the inlet of the said sub-passage to the outlet thereof, and the difference in the detected amount of the gas flow between the cases where the leak hole is blocked and where not blocked does not exceed 2%.

19. A gas flow measurement apparatus comprising a main passage for making a gas flow, a sub-passage for making part of the gas flow, and gas flow detecting element which are provided at said sub-passage for detecting a gas flow rate;

said gas flow measurement apparatus characterized in that:

a through hole between the internal surface and the external surface of said sub-passage is provided en route from the inlet of the said sub-passage to the outlet thereof;

if there is water in said sub-passage, the water can be drained out of said through hole, and a structural means for preventing a liquid film or liquid drop from being formed due to surface tension is provided close to the opening of said through hole on the external surface of said sub-passage.

20. A gas flow measurement apparatus comprising a main passage for making a gas flow, a sub-passage for making part of the gas flow, and gas flow detecting elements which are provided at said sub-passage for detecting a gas flow rate;

said gas flow measurement apparatus characterized in that:
a through hole between the internal surface and the external surface of said sub-passage is provided en route from the inlet of the said sub-passage to the outlet thereof,
a plate-formed member or a rod-formed member is arranged at the position just coming out of the opening of said through hole on the external surface of said sub-passage, and said plate-formed member or said rod-formed member faces to the opening of said through hole.

21. The gas flow measurement apparatus according to claim 20, wherein
said plate-formed member or said rod-formed member is located on the extension approximately of the center line of the opening of said through hole on the external surface of said sub-passage.

22. The gas flow measurement apparatus according to claim 20, wherein
a gap is arranged between the end surface of said plate-formed member or a rod-formed member and the opening of said through hole on the external surface of said sub-passage.

* * * * *